US010495434B1

(12) United States Patent
Motz et al.

(10) Patent No.: US 10,495,434 B1
(45) Date of Patent: Dec. 3, 2019

(54) TELESCOPIC MEASURING DEVICE

(71) Applicants: William Motz, E. Palatka, FL (US); Patricia Motz, E. Palatka, FL (US)

(72) Inventors: William Motz, E. Palatka, FL (US); Patricia Motz, E. Palatka, FL (US)

( * ) Notice: Subject to any disclaimer, the term of this patent is extended or adjusted under 35 U.S.C. 154(b) by 233 days.

(21) Appl. No.: 15/665,485

(22) Filed: Aug. 1, 2017

(51) Int. Cl.
*G01B 3/08* (2006.01)
*G01B 3/10* (2006.01)
*G01B 3/20* (2006.01)
*G01B 3/00* (2006.01)
*G01C 15/00* (2006.01)

(52) U.S. Cl.
CPC ............. *G01B 3/08* (2013.01); *G01B 3/1084* (2013.01); *G01B 3/20* (2013.01); *G01B 3/00* (2013.01); *G01C 15/00* (2013.01)

(58) Field of Classification Search
CPC .................................... G01B 3/08; G01B 3/20
USPC .................................................... 33/809, 812
See application file for complete search history.

(56) References Cited

U.S. PATENT DOCUMENTS 477,104 A * 6/1892 Darling .................... G01B 3/20 33/812
904,830 A * 11/1908 Boeck ...................... G01B 3/08 33/809
1,642,977 A * 9/1927 Stork ....................... G01B 3/08 33/458
2,465,778 A * 3/1949 Yunger .................... A41H 1/02 33/8
2,740,201 A * 4/1956 Swanson .................. G01B 3/08 33/809
3,190,008 A 6/1965 Weiss
4,186,493 A * 2/1980 Khan ....................... G01B 3/08 33/809
4,318,228 A * 3/1982 Kimura .................. G01C 15/08 33/296
4,336,655 A * 6/1982 Thingstad ................ G01B 3/08 33/809
D276,897 S 12/1984 Woods
4,638,563 A * 1/1987 Buniff ...................... G01B 3/08 33/833
5,038,493 A * 8/1991 Stabs ....................... G01B 3/08 33/809
5,070,620 A * 12/1991 Crain ........................ F16B 7/10 33/296
5,317,813 A 6/1994 Reed
5,642,569 A 7/1997 Palmer
5,735,058 A * 4/1998 Jimenez ................... G01B 3/08 33/483
5,915,810 A 6/1999 Cameron
6,971,185 B2 12/2005 Scarborough
(Continued)

FOREIGN PATENT DOCUMENTS

WO 2009018601 2/2009

*Primary Examiner* — Christopher W Fulton

(57) ABSTRACT

The telescopic measuring device is a tool that enables a user to measure distances that might otherwise be beyond their reach. A measuring blade contained within a housing may be extended until a wear block at one end of the telescopic measuring device and an end hook at the other and of the telescopic measuring device span the distance to be measured. The measuring blade may then be locked into position using a clocking clamp and the measured distance may be read through a sighting window where a sight line will align with measurement indicia on the measuring blade.

7 Claims, 4 Drawing Sheets

(56) References Cited

U.S. PATENT DOCUMENTS

| | | | | |
|---|---|---|---|---|
| 8,201,340 | B2 * | 6/2012 | Steffensen | G01C 15/06<br>33/296 |
| 8,875,408 | B2 * | 11/2014 | Steffensen | G01C 15/06<br>33/296 |
| 8,898,921 | B1 | 12/2014 | Adorno | |
| 9,116,026 | B1 * | 8/2015 | Parker | G01B 3/004 |
| 9,428,923 | B1 * | 8/2016 | Christner | E04F 21/0015 |
| 2007/0079521 | A1 * | 4/2007 | Hill | G01B 3/08<br>33/809 |
| 2013/0227854 | A1 * | 9/2013 | Zhang | G01B 3/002<br>33/809 |
| 2018/0023934 | A1 * | 1/2018 | Gjertsen | G01B 3/08<br>33/809 |

* cited by examiner

TELESCOPIC MEASURING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of tools, more specifically, a telescopic measuring device.

SUMMARY OF INVENTION

The telescopic measuring device is a tool that enables a user to measure distances that might otherwise be beyond their reach. A measuring blade contained within a housing may be extended until a wear block at one end of the telescopic measuring device and an end hook at the other and of the telescopic measuring device span the distance to be measured. The measuring blade may then be locked into position using a clocking clamp and the measured distance may be read through a sighting window where a sight line will align with measurement indicia on the measuring blade.

An object of the invention is to provide a measuring tool that extends to measure distance beyond the user's reach.

Another object of the invention is to provide a sight window with a sight line for reading a distance directly from the measuring blade.

A further object of the invention is to provide a replaceable wear block at one end of the measuring tool.

Yet another object of the invention is to provide a locking clamp that allows the measuring tool to retain a length until the distance is read from the measuring blade.

These together with additional objects, features and advantages of the telescopic measuring device will be readily apparent to those of ordinary skill in the art upon reading the following detailed description of the presently preferred, but nonetheless illustrative, embodiments when taken in conjunction with the accompanying drawings.

In this respect, before explaining the current embodiments of the telescopic measuring device in detail, it is to be understood that the telescopic measuring device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the telescopic measuring device.

It is therefore important that the claims be regarded as including such equivalent construction insofar as they do not depart from the spirit and scope of the telescopic measuring device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
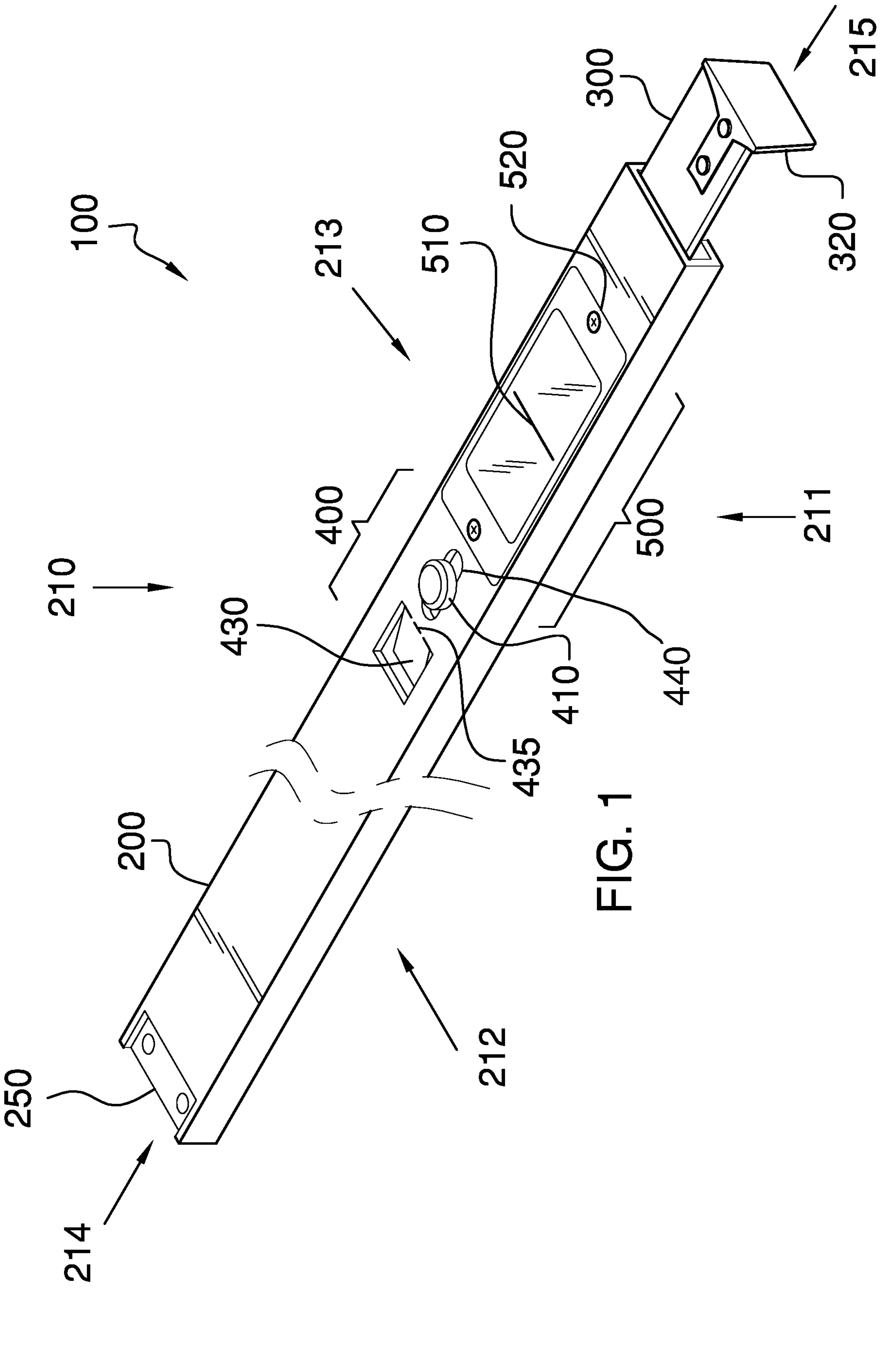
FIG. 1 is a perspective view of an embodiment of the disclosure.
Figure 2:
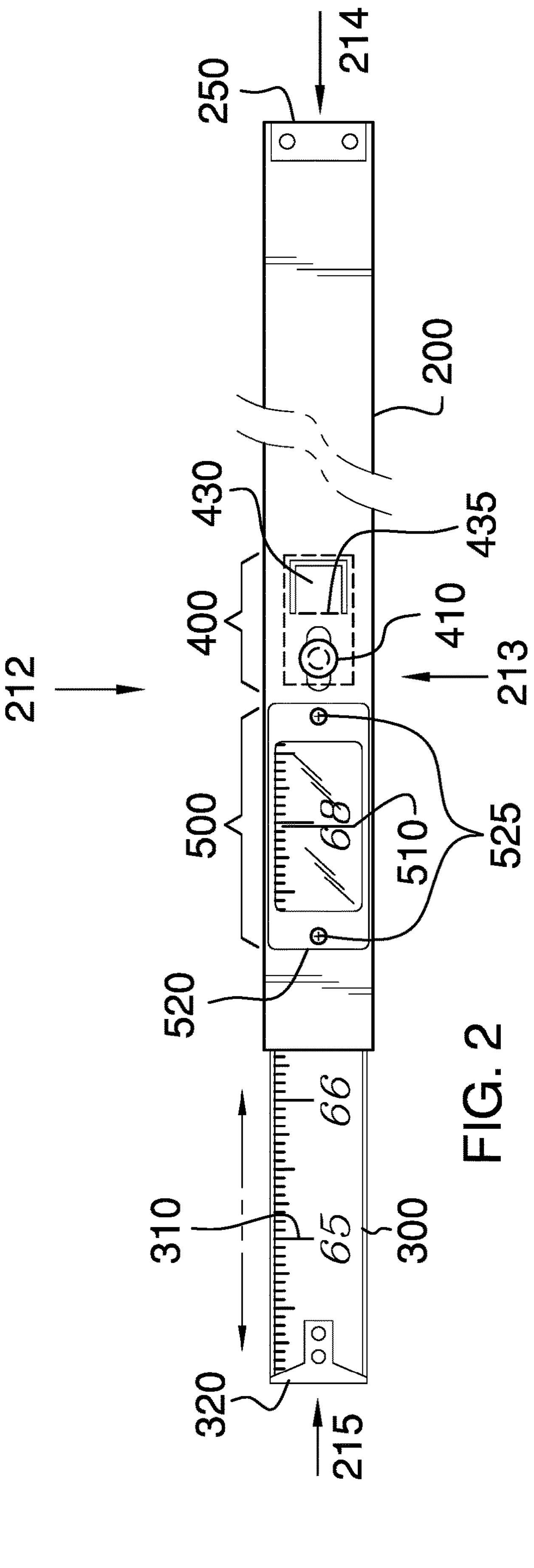
FIG. 2 is a top view of an embodiment of the disclosure.
Figure 3:
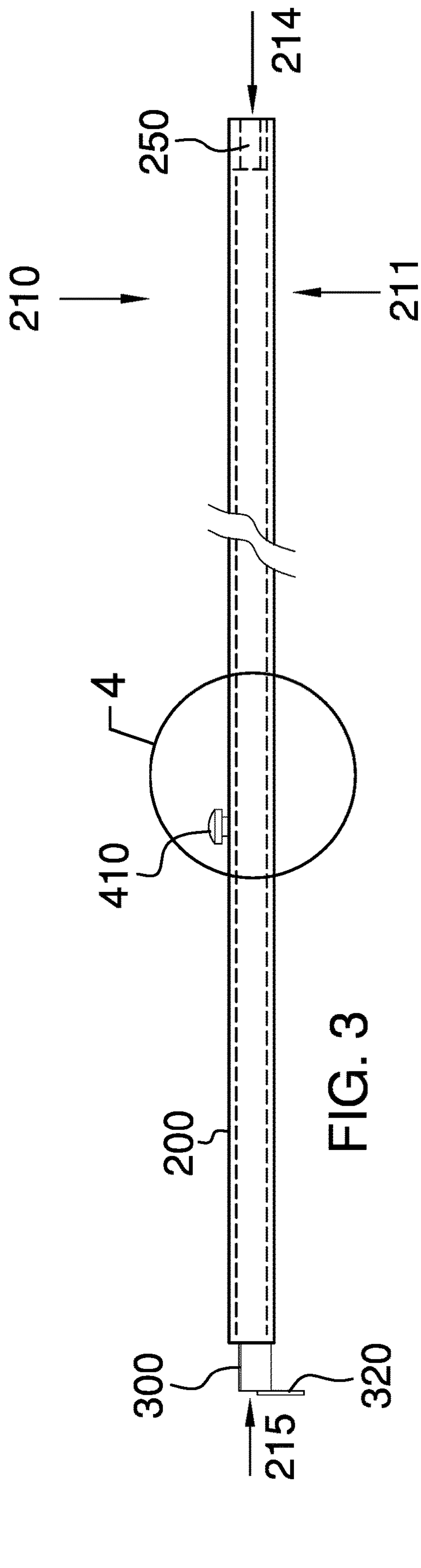
FIG. 3 is a side view of an embodiment of the disclosure.
Figure 4:
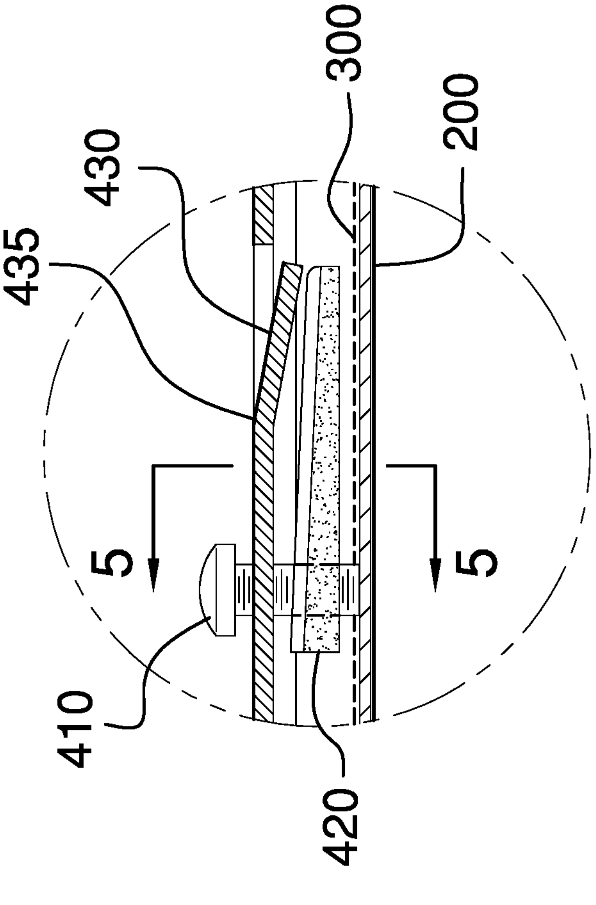
FIG. 4 is a cross-sectional view of an embodiment of the disclosure across 4-4 as shown in FIG. 3.
Figure 5:
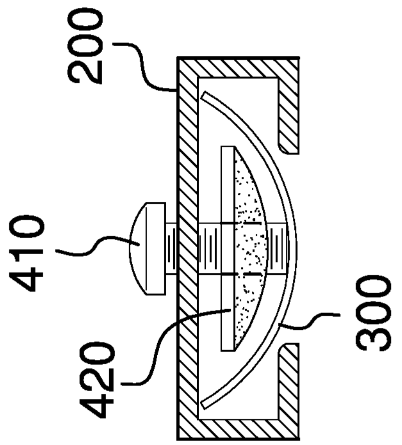
FIG. 5 is a cross-sectional view of an embodiment of the disclosure across 5-5 as shown in FIG. 4.
Figure 6:
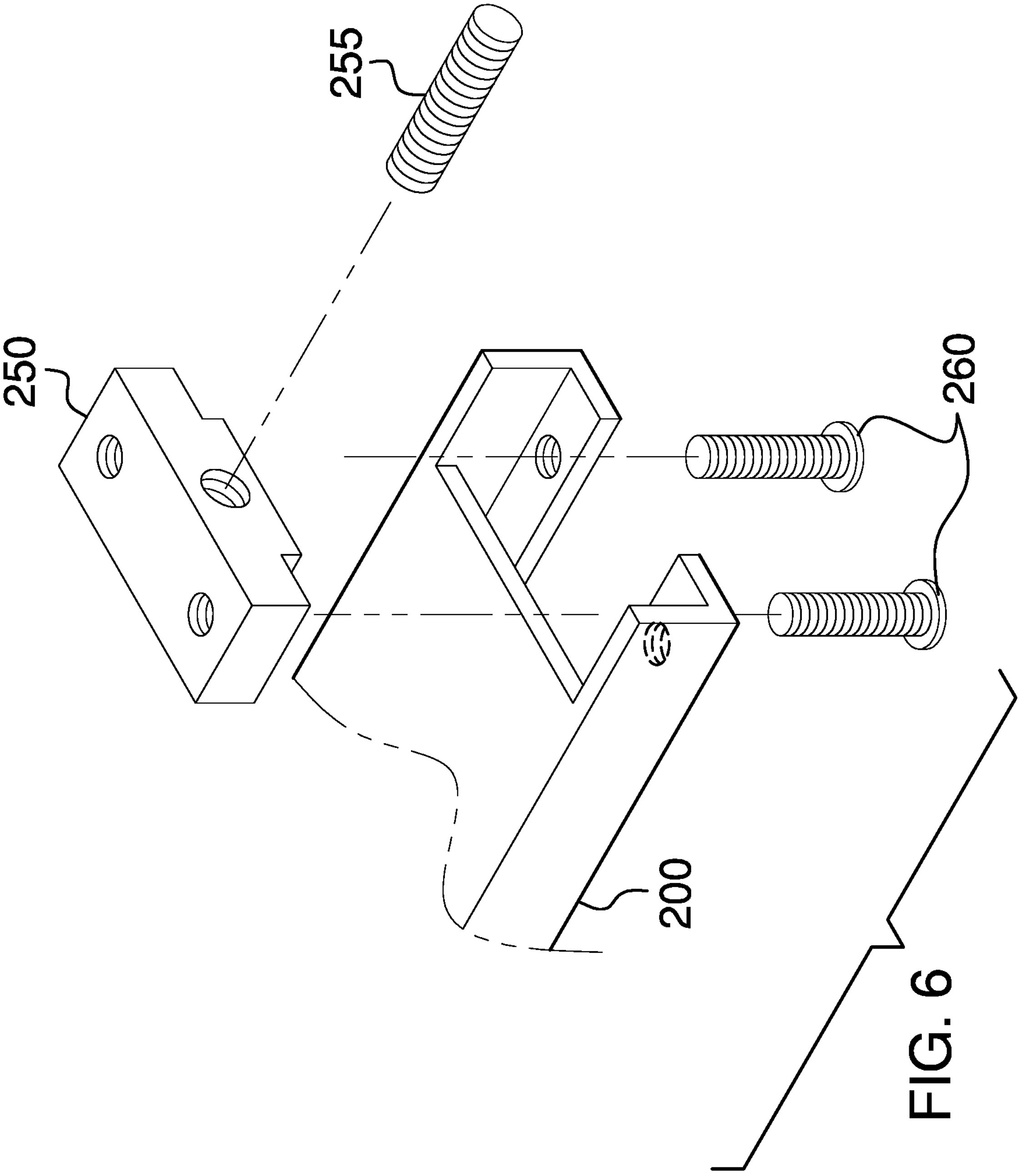
FIG. 6 is a detail view of an embodiment of the disclosure focusing on the wear block.

Detailed reference will now be made to a first potential embodiment of the disclosure, which is illustrated in FIGS. 1 through 6.

The telescopic measuring device 100 (hereinafter invention) comprises a housing 200, a measuring blade 300, a sighting window 500 and a locking clamp 400. The invention 100 may be used to measure distances that are beyond the reach of a user. The measuring blade 300 may be extended from the housing 200 and locked in place. A measurement read at the sighting window 500 may display the length of the invention 100 from a wear block 250 at one end to an end hook 320 at the opposite end.

The invention 100 has a top 210, a bottom 211, a front 212, a rear 213, a left end 214, and a right end 215. The housing 200 is a hollow, cuboid body for the invention 100. The left end 214 and the right end 215 may be open except for the presence of the wear block 250 coupled to the left end 214. The length of the housing 200, as measured from the left end 214 to the right end 215, is significantly larger than the width, measured from the front 212 to the rear 213, and the height, measured from the top 210 to the bottom 211. The housing 200 may be fabricated from metal or a durable plastic. As a non-limiting example, the housing 200 may be fabricated from aluminum. In some embodiments, the length of the housing 200 may be 40 inches, 60 inches, or 80 inches while the width may be approximately 1 inch and the height may be on the order of ½ inch or less. In some embodiments, a gap may run longitudinally from the left end 214 to the right end 215 on the bottom 211, giving the housing 200 a C-shaped cross section.

The housing 200 encloses the measuring blade 300, which is free to slide within the hollow interior of the housing 200. Since the measuring blade 300 may be approximately the same length as the housing 200, the housing 200 may completely cover the measuring blade 300 when the measuring blade 300 is slid into the housing 200. When the measuring blade 300 is fully extended, meaning that the measuring blade 300 is withdrawn from the housing 200 as far as it will go without detaching from the housing 200, the combined length of the housing 200 and the measuring blade 300 may be approximately twice the length of the housing 200 alone. As a non-limiting example, if the length of the housing 200 is 40 inches then the length of the measuring blade 300 may also be approximately 40 inches and the combined length of the housing 200 and the measuring blade 300 may be approximately 80 inches. This means that the invention 100, which is only 40 inches in length is capable of measuring distances up to approximately 80 inches.

The measuring blade 300 is a metal strip with measurement indicia 310 appearing on the face of the measuring blade 300. In some embodiments the measuring blade 300 may be fabricated from spring steel. The measurement indicia 310 may be printed or etched and may represent linear distances in US customary units of inches and fractional portions of an inch, metric units of millimeters and centimeter, or a combination thereof.

The width of the measuring blade 300 is larger than the width of the interior space of the housing 200. This means that the measuring blade 300 must be bowed in order to fit within the housing 200. This bowing gives the measuring blade 300 stiffness so that when the measuring blade 300 is moved to a position that places the measuring blade 300 at least partially outside of the housing 200, the measuring blade 300 will not bend.

The end hook 320 may be coupled to the measuring blade 300 on the right end 215 of the measuring blade 300. The end hook 320 may be used to retain one end of the measuring blade 300 on an edge or to stop further extension of the measuring blade 300 when the measuring blade 300 reaches a surface that is perpendicular to the direction of extension.

The sighting window 500 comprises a lens 520 and a sight line 510. The lens 520 may be a clear plastic covering over a rectangular cutout on the top 210 side of the housing 200 that allows the user to see the measuring blade 300 by looking through the sighting window 500. The lens 520 has a length, which is measured from the left end 214 of the lens 520 to the right end 215 of the lens 520 and the lens 520 has a width which is measured from the front 212 side of the lens 520 to the rear 213 side of the lens 520. In some embodiments, the width of the lens 520 may be between 50% and 100% of the width of the housing 200 and the length of the lens 520 may be approximately 150% of the width of the lens 520. In some embodiments, the lens 520 may be fabricated from clear acrylic plastic.

The sight line 510 is inscribed, painted, or otherwise marked on the sighting window 500 at a position, which is approximately at the length-wise center of the sighting window 500. The sight line 510 has a length, which is measured from the front 212 of the sight line 510 to the rear 213 of the sight line 510 and the length of the sight line 510 may be between 50% and 100% of the width of the lens 520.

The sight line 510 has a width, which is measured perpendicularly to the length of the sight line 510. The width of the sight line 510 may be kept as narrow as possible so that the sight line 510 does not block the view of the measuring blade 300 and so that the sight line 510 more precisely aligns with a measurement index on the measuring blade 300. In some embodiments, the width of the sight line 510 may be 50 mils or less.

The sight line 510 is oriented to run from the front 212 of the housing 200 to the rear 213 of the housing 200, which is also perpendicular to the length of the housing 200. In this orientation, the sight line 510 precisely aligns with one measurement index on the measuring blade 300.

The lens 520 may mount to the housing 200 using two or more lens mounting screws 525, which pass through holes in the lens 520 and into threaded holes in the housing 200. In some embodiments, the holes in the lens 520 may be slotted to allow an adjustment of the position of the sight line 510 over the measuring blade 300.

The locking clamp 400 comprises a locking screw 410, a locking foot 420 and a clamp jam block 430. The locking clamp 400 holds the measuring blade 300 in place when the locking screw 410 is tightened and allows the measuring blade 300 to move when the locking screw 410 is loosened. Specifically, the locking screw 410 passes through a clamp screw hole 440 in the top 210 of the housing 200 and into the locking foot 420, which is located inside the hollow body of the housing 200. The clamp screw hole 440 may be slotted by lengthening the hole in a direction running from the left end 214 of the housing 200 towards the right end 215 of the housing 200 to allow some longitudinal movement of the locking clamp 400. The locking foot 420 may be flat and inclined on the top 210 of the locking foot 420 and curved to match the bow of the measuring blade 300 on the bottom 211 of the locking foot 420. Due to the incline on the locking foot 420, the locking foot 420 may be thicker on the right end 215 than it is on the left end 214. In some embodiments, the locking foot 420 may be fabricated from low-density polyethylene (LDPE).

The clamp jam block 430 is an area of the top 210 of the housing 200 surrounded on three sides by a cutout and bent downwards at a bend line 435. When the locking screw 410 is loosened to allow movement of the locking clamp 400, the locking clamp 400 may be moved along the slot of the clamp screw hole 440 and the locking foot 420 may be jammed between the clamp jam block 430 and the measuring blade 300. This may pinch the measuring blade 300 between the locking foot 420 and the bottom 211 portion of the housing 200 and thus prevent the measuring blade 300 from moving. The locking screw 410 may then be tightened to hold the locking foot 420 in this position. To allow movement of the measuring blade 300 again, the locking screw 410 may be loosened, the locking foot 420 may be slid out from under the clamp jam block 430, and the locking screw 410 may be tightened again.

The wear block 250 is coupled to the left end 214 of the housing 200 and the wear block 250 is held in place on the housing 200 by two wear block retention screws 260. The wear block 250 extends farther to the left end 214 of the invention 100 than the left end 214 of the housing 200. The wear block 250 serves two functions:

First, since the wear block 250 extends farther to the left end 214 than the housing 200, the wear block 250 is subject to the abrasive action of surfaces that the invention 100 might be used on. After extensive use, the wear block 250 may actually become shorter due to wear and it may be replaced by removing the two wear block retention screws 260, removing the wear block 250, and installing a new one using the same screws.

The second purpose is that the wear block 250 provides a length compensation screw 255, which is normally screwed into the wear block 250 and does not affect the overall length of the invention 100. However when the invention 100 is used on uneven or inconsistent surfaces the length compensation screw 255 may be screwed out of the wear block 250 to add length to the invention 100 and to provide a single point to rest upon. Non-limiting examples of such uneven or inconsistent surfaces may include carpeting, grass, and soft soil.

To use the invention 100, the length compensation screw 255 may be screwed all the way into the wear block 250 and the wear block 250 may be placed against a first surfaced or mark. As a non-limiting example, the invention 100 may be placed in a vertical position against a wall over a fireplace with the wear block 250 resting on the top of the mantel. The locking screw 410 may be loosened and the locking clamp 400 may be slid towards the end hook 320—into the non-locking position. The measuring blade 300 may be extended out from the housing 200 until the end hook 320 reaches a second surface or mark. As a non-limiting example, the measuring blade 300 may be extended until the end hook 320 reaches the ceiling above the mantel. The locking clamp 400 may be slid towards the wear block 250—into the locking position—and the locking screw 410 may be tightened to hold the measuring blade 300 in place. The user may take the invention 100 down from this position and read the distance from the first surface or mark to the second surface or mark by looking through the sighting window 500 and reading the distance from the measurement indicia 310 on the measuring blade 300 where the sight line 510 lines up visually with the measurement indicia 310. As a non-limiting example, the measurement read through the sighting window 500 may give the distance from the top of the mantel to the ceiling above the mantel, even though the user could not otherwise reach the ceiling without a ladder.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A telescopic measuring device comprising:

a housing, a measuring blade, a sighting window and a locking clamp;

wherein the telescopic measuring device is adapted to measure distances that are beyond the reach of a user;

wherein the measuring blade extends from the housing and locks in place;

wherein a measurement read at the sighting window displays the length of the telescopic measuring device from a wear block at one end to an end hook at the opposite end;

wherein the sighting window comprises a lens and a sight line;

wherein the lens is a clear plastic covering over a rectangular cutout on the top side of the housing;

wherein the lens is adapted to allow the user to see the measuring blade by looking through the sighting window;

wherein the lens mounts to the housing using two or more lens mounting screws which pass through holes in the lens and into threaded holes in the housing;

wherein the telescopic measuring device has a top, a bottom, a front, a rear, a left end, and a right end;

wherein the housing is a hollow, cuboid body for the telescopic measuring device;

wherein the left end and the right end are open except for the presence of the wear block coupled to the left end;

wherein the length of the housing, as measured from the left end to the right end, is larger than the width, measured from the front to the rear, and the height, measured from the top to the bottom;

wherein the housing encloses the measuring blade which is free to slide within the hollow interior of the housing;

wherein the housing covers the measuring blade when the measuring blade is slid into the housing;

wherein when the measuring blade is fully extended, the combined length of the housing and the measuring blade is twice the length of the housing alone;

wherein the measuring blade is a metal strip with measurement indicia appearing on the face of the measuring blade;

wherein the measurement indicia represents linear distances in US customary units of inches and fractional portions of an inch, metric units of millimeters and centimeter, or a combination thereof;

wherein the width of the measuring blade is larger than the width of the interior space of the housing;

wherein the measuring blade is bowed in order to fit within the housing;

wherein the bowing of the measuring blade gives the measuring blade stiffness;

wherein the end hook is coupled to the measuring blade on the right end of the measuring blade;

wherein the end hook is used to retain one end of the measuring blade on an edge or to stop further extension of the measuring blade;

wherein the lens has a length which is measured from the left end of the lens to the right end of the lens;

wherein the lens has a width which is measured from the front side of the lens to the rear side of the lens;

wherein the sight line is marked on the sighting window at a position which is at the length-wise center of the sighting window;

wherein the sight line has a length which is measured from the front of the sight line to the rear of the sight line;

wherein the sight line is oriented to run from the front of the housing to the rear of the housing which is also perpendicular to the length of the housing;

wherein the sight line aligns with one measurement index on the measuring blade;

wherein the locking clamp comprises a locking screw, a locking foot and a clamp jam block;

wherein the locking clamp holds the measuring blade in place when the locking screw is tightened;

wherein the locking clamp allows the measuring blade to move when the locking screw is loosened;

wherein the locking screw passes through a clamp screw hole in the top of the housing and into the locking foot which is located inside the hollow body of the housing;

wherein the clamp screw hole is slotted by lengthening the hole in a direction running from the left end of the housing towards the right end of the housing to allow some longitudinal movement of the locking clamp;

wherein the locking foot is flat and inclined on the top of the locking foot and curved to match the bow of the measuring blade on the bottom of the locking foot;

wherein the locking foot is thicker on the right end than it is on the left end.

2. The telescopic measuring device according to claim 1 wherein a gap runs longitudinally from the left end to the right end on the bottom, giving the housing a C-shaped cross section.

3. The telescopic measuring device according to claim 1 wherein the housing is fabricated from aluminum;

wherein the length of the housing is 40 inches, 60 inches, or 80 inches;

wherein the width is 1 inch;

wherein the height is ½ inch or less;

wherein the measuring blade is fabricated from spring steel;

wherein the locking foot is fabricated from low density polyethylene (LDPE).

4. The telescopic measuring device according to claim 3 wherein the clamp jam block is an area of the top of the housing surrounded on three sides by a cutout and bent downwards at a bend line;

wherein when the locking screw is loosened to allow movement of the locking clamp, the locking clamp moves along the slot of the clamp screw hole and the locking foot jams between the clamp jam block and the measuring blade;

wherein the jamming of the locking foot between the clamp jam block and the measuring blade pinches the measuring blade between the locking foot and the bottom portion of the housing and thus prevents the measuring blade from moving;

wherein the locking screw is tightened to hold the locking foot in this position.

5. The telescopic measuring device according to claim 4 wherein the wear block is coupled to the left end of the housing;

wherein the wear block is held in place on the housing by two wear block retention screws;

wherein the wear block extends farther to the left end of the telescopic measuring device than the left end of the housing.

6. The telescopic measuring device according to claim 5 wherein the wear block is subject to the abrasive action of surfaces that the telescopic measuring device is be used on;

wherein the wear block is replaced after a period of wear by removing the two wear block retention screws, removing the wear block, and installing a new one using the same screws.

7. The telescopic measuring device according to claim 6 wherein the wear block provides a length compensation screw;

wherein the length compensation screw is normally screwed into the wear block and does not affect the overall length of the telescopic measuring device;

wherein the length compensation screw is screwed out of the wear block to add length to the telescopic measuring device and to provide a single point to rest upon.

* * * * *